US012359500B2

(12) United States Patent
Fernando et al.

(10) Patent No.: US 12,359,500 B2
(45) Date of Patent: Jul. 15, 2025

(54) REPLACEMENT LINK FOR A ROLLING GRILL ENCLOSURE AND METHOD THEREOF

(71) Applicant: CORNELLCOOKSON, LLC, Mountain Top, PA (US)

(72) Inventors: Brian Fernando, Avondale, AZ (US); Michael Richard Wheat, Glendale, AZ (US); Richard Ryan Carroll, Phoenix, AZ (US); Thomas Hugh Moyer, Orwigsburg, PA (US)

(73) Assignee: CORNELLCOOKSON, LLC, Mountain Top, PA (US)

( * ) Notice: Subject to any disclaimer, the term of this patent is extended or adjusted under 35 U.S.C. 154(b) by 432 days.

(21) Appl. No.: 17/531,415

(22) Filed: Nov. 19, 2021

(65) Prior Publication Data

US 2022/0074263 A1 Mar. 10, 2022

Related U.S. Application Data

(63) Continuation of application No. PCT/US2020/034019, filed on May 21, 2020.

(60) Provisional application No. 62/850,594, filed on May 21, 2019.

(51) Int. Cl.
*E06B 9/15* (2006.01)
*E06B 9/18* (2006.01)
*E06B 9/58* (2006.01)

(52) U.S. Cl.
CPC .................. *E06B 9/18* (2013.01); *E06B 9/15* (2013.01); *E06B 9/581* (2013.01)

(58) Field of Classification Search
CPC ....... E06B 2009/155; E06B 2009/1566; E06B 2009/1533; E06B 9/18; E06B 9/11; E06B 9/15; E06B 2009/1544; E06B 9/17
See application file for complete search history.

(56) References Cited

U.S. PATENT DOCUMENTS 2,099,408 A 11/1937 Packert et al.
2,390,116 A * 12/1945 Michelman ............... E06B 9/15 160/133
3,216,102 A 11/1965 Vecchiarelli
4,345,635 A 8/1982 Solomon
4,723,588 A 2/1988 Ruppel
5,566,739 A 10/1996 Hoffman
7,409,980 B1 * 8/2008 Heissenberg ............. E06B 9/08 160/264
2005/0205222 A1 9/2005 Miller
(Continued)

FOREIGN PATENT DOCUMENTS

AT 406701 B * 6/2000 ............... E06B 9/15
CA 3037950 A1 * 4/2018 ............... E06B 9/18
(Continued)

OTHER PUBLICATIONS

KR 200403200 machine translation; Dec. 9, 2005 (Year: 2005).*
(Continued)

*Primary Examiner* — Abe Massad

(57) ABSTRACT

A replacement link for a rolling grill enclosure having a longitudinal body disposed about a longitudinal axis, and a first end grommet contiguous with a first end of the longitudinal body, the first end grommet having a discontinuous first grommet body disposed about a first center.

22 Claims, 8 Drawing Sheets

(56) References Cited

U.S. PATENT DOCUMENTS

| | | | | |
|---|---|---|---|---|
| 2016/0230450 | A1* | 8/2016 | Ronchetti | E06B 9/15 |
| 2020/0040652 | A1* | 2/2020 | Price | E06B 9/18 |

FOREIGN PATENT DOCUMENTS

| | | | |
|---|---|---|---|
| DE | 2210366 | A1 | 9/1973 |
| KR | 200403200 | Y1 * | 12/2005 |

OTHER PUBLICATIONS

Canadian Office Action mailed in corresponding CA Application No. 3,140,396 on Jan. 7, 2023, 4 pages.
International Search Report mailed Aug. 14, 2020 for International Patent Application No. PCT/US2020/034019.
Written Opinion mailed Aug. 14, 2020 for International Patent Application No. PCT/US2020/034019.
International Search Report and Written Opinion for PCT/US2020/034019; dated Aug. 14, 2020; 35 pages.

* cited by examiner

REPLACEMENT LINK FOR A ROLLING GRILL ENCLOSURE AND METHOD THEREOF

CROSS-REFERENCE TO RELATED APPLICATIONS

This application claims priority to International PCT Patent Application No. PCT/US2020/034019, filed May 21, 2020 entitled "Replacement Link for a Rolling Grill Enclosure and Method Thereof", which claims the benefit of U.S. Provisional Patent Application No. 62/850,594 filed May 21, 2019 entitled "Replacement Link for a Rolling Grill Enclosure and Method Thereof", each of which is incorporated by reference herein in its entirety.

FIELD OF THE INVENTION

The present invention generally relates to a replacement link for a rolling grill enclosure system and method thereof, and more particularly, the use of a link to replace a damaged or broken link within a rolling grill enclosure.

BACKGROUND OF THE INVENTION

Rolling grills are widely used to provide protection and security for an enclosed area. Specifically, rolling grills provide security to an enclosed area while also allowing ingress and egress. Rolling grills are comprised of strong, durable links that connect together to make up the rolling grill. The links allows the rolling grill to withstand large forces, preventing unwanted individuals or objects from entering the enclosed area. However, when a link that comprises the rolling grill is damaged or broken, it can be difficult to replace. Current rolling grills require a multitude of tools to cut through the rolling grill to access the damaged link. Further, large sections of the rolling grill may need to be replaced due to a single damaged or broken link. This can take a significant amount of time and resources, and may result in rolling grills staying damaged for longer periods of time, thereby reducing their efficacy for providing safety and protection.

Accordingly, there is a need for a more efficient method of replacing damaged or broken links within a rolling grill that can still provide the necessary safety and protection required.

BRIEF SUMMARY OF THE INVENTION

Embodiments of the present invention are directed to a replacement link for a rolling grill enclosure including a longitudinal body disposed about a longitudinal axis and a first end grommet contiguous with a first end of the longitudinal body, the first end grommet having a discontinuous first grommet body disposed about a first center.

In some embodiments, the longitudinal body comprises a curved longitudinal body. In some embodiments, the first center is offset from the longitudinal axis in a first direction.

In some embodiments, the replacement link further includes a second end grommet contiguous with a second end of the longitudinal body, the second end grommet having a discontinuous second grommet body disposed about a second center. The second center may be offset from the longitudinal axis in a second direction, the first center and second center may be on opposite sides of the longitudinal axis In some embodiments, the replacement link further includes a grommet axis bisecting the first center and the second center, the first grommet body having a first aperture with a first aperture width, the first aperture width including a first midpoint that is offset from the grommet axis in the first direction, and the second grommet body having a second aperture with a second aperture width, the second aperture width including a second midpoint that is offset from the grommet axis in the second direction.

In some embodiments, the first aperture is entirely offset from the grommet axis in the first direction. The grommet axis may pass through the first aperture. The first grommet body may be configured and dimensioned to receive a first rod having a first rod diameter that is larger than the first aperture, the replacement link may be pivotable about the first rod when the first rod is received in the first grommet body.

In some embodiments, the second grommet body is configured and dimensioned to receive a second rod having a second rod diameter that is larger than the second aperture, the replacement link being pivotable about the second rod when the second rod is received in the second grommet body. The first grommet body may be configured to deflect about the first rod when the first rod is urged through the first aperture.

In some embodiments, the second grommet body is configured to deflect about the second rod when the second rod is urged through the second aperture. In some embodiments, an obtuse angle between a) a line normal to the second midpoint and extending away from the second center and b) the grommet axis is between 105° degrees and 140°. In some embodiments, an acute angle between a) a line normal to the first midpoint and extending away from the first center and b) the grommet axis is between 10° degrees and 40°.

In some embodiments, a line normal to the first aperture width extending through the first midpoint is offset from the first center. In some embodiments, a line normal to the second aperture width extending through the second midpoint is offset from the second center.

In some embodiments, the first grommet body includes an interior face having first diameter and a second diameter, wherein the first diameter is substantially equal to the first rod diameter. The interior face of the first grommet body may be substantially a teardrop shape with a first diameter and a second diameter. In some embodiments, the first diameter of the first grommet body is greater than the second diameter of the first grommet body.

In some embodiments, the second grommet body includes an interior face having a first diameter and a second diameter, wherein the first diameter of the second grommet body being substantially equal to the second rod diameter. The first diameter of the second grommet body may be substantially equal to a first diameter of the first grommet body and the second diameter of the second grommet body is substantially equal to a second diameter of the first grommet body. In some embodiments, the first diameter of the second grommet body is greater than the second diameter of the second grommet body.

In some embodiments, the first aperture width and the second aperture width are equal.

In some embodiments, a curved portion of the first grommet body has a uniform thickness. A curved portion of the second grommet body may have a uniform thickness.

In some embodiments, the body has a uniform thickness throughout a substantial portion of the body. The uniform thickness of the body may be greater than a uniform thickness of a curved portion of the first grommet body and a uniform thickness of a curved portion of the second grommet body.

In some embodiments, the body includes a first edge and a second edge, the first edge being substantially parallel to the second edge, the first edge and the second edge being offset on opposite sides of the longitudinal axis.

In some embodiments, the grommet axis is substantially parallel to the longitudinal axis of the body.

In some embodiments, the longitudinal body includes a first guide face disposed at an obtuse angle to the longitudinal axis. The longitudinal body may include a second guide face disposed at an obtuse angle to the longitudinal axis. The longitudinal body may include a first guide face disposed at an obtuse angle to the longitudinal axis, the first guide face extending from the first edge, across the longitudinal axis, and terminating proximate to an interior surface of the first end grommet.

In some embodiments, the longitudinal body includes a second guide face disposed at an obtuse angle to the longitudinal axis, the second guide face extending from a second edge, across the longitudinal axis, and terminating proximate to an interior surface of the second grommet body, the first guide face and second guide face being substantially parallel.

Another embodiment of the present invention may provide a method for repairing an enclosure system using the replacement link, the method includes the steps of inserting a first rod into a first aperture of a first grommet body of the replacement link, the first aperture defined by a first portion of the first grommet body, the first portion configured to deflect about the first rod, rotating the replacement link about the first rod such that a second grommet body of the replacement link engages a second rod, and inserting the second rod into a second aperture of the second grommet body, the second aperture defined by a second portion of the second grommet body, the second portion configured to deflect about the second rod.

In some embodiments, the method further includes reducing a width of the first aperture after inserting the first rod within the first grommet body.

In some embodiments, the method further includes reducing a width of the second aperture after inserting the second rod within the second grommet body.

In some embodiments, a curved body of the replacement link is flexed prior to insertion of the second rod into the second end.

In some embodiments, the method further includes the second rod is flexed prior to insertion of the second rod into the second end.

Another embodiment of the present invention may provide a grill for an enclosure system including a first and a second side opposite the first side, a plurality of edge links adjacent the first side and adjacent the second side, a plurality of field links disposed between the plurality of edge links, and a replacement link configured to replace one of the plurality of field links while the plurality of edge links remain in a fixed position, the replacement links including a longitudinal body disposed about a longitudinal axis, and a first end grommet contiguous with a first end of the longitudinal body, the first end grommet having a discontinuous first grommet body disposed about a first center.

BRIEF DESCRIPTION OF THE SEVERAL VIEWS OF THE DRAWINGS

The following detailed description of embodiments of the closure system and method thereof will be better understood when read in conjunction with the appended drawings of an exemplary embodiment. It should be understood, however, that the invention is not limited to the precise arrangements and instrumentalities shown.

DETAILED DESCRIPTION OF THE EXEMPLARY EMBODIMENTS OF THE INVENTION

Figure 1:
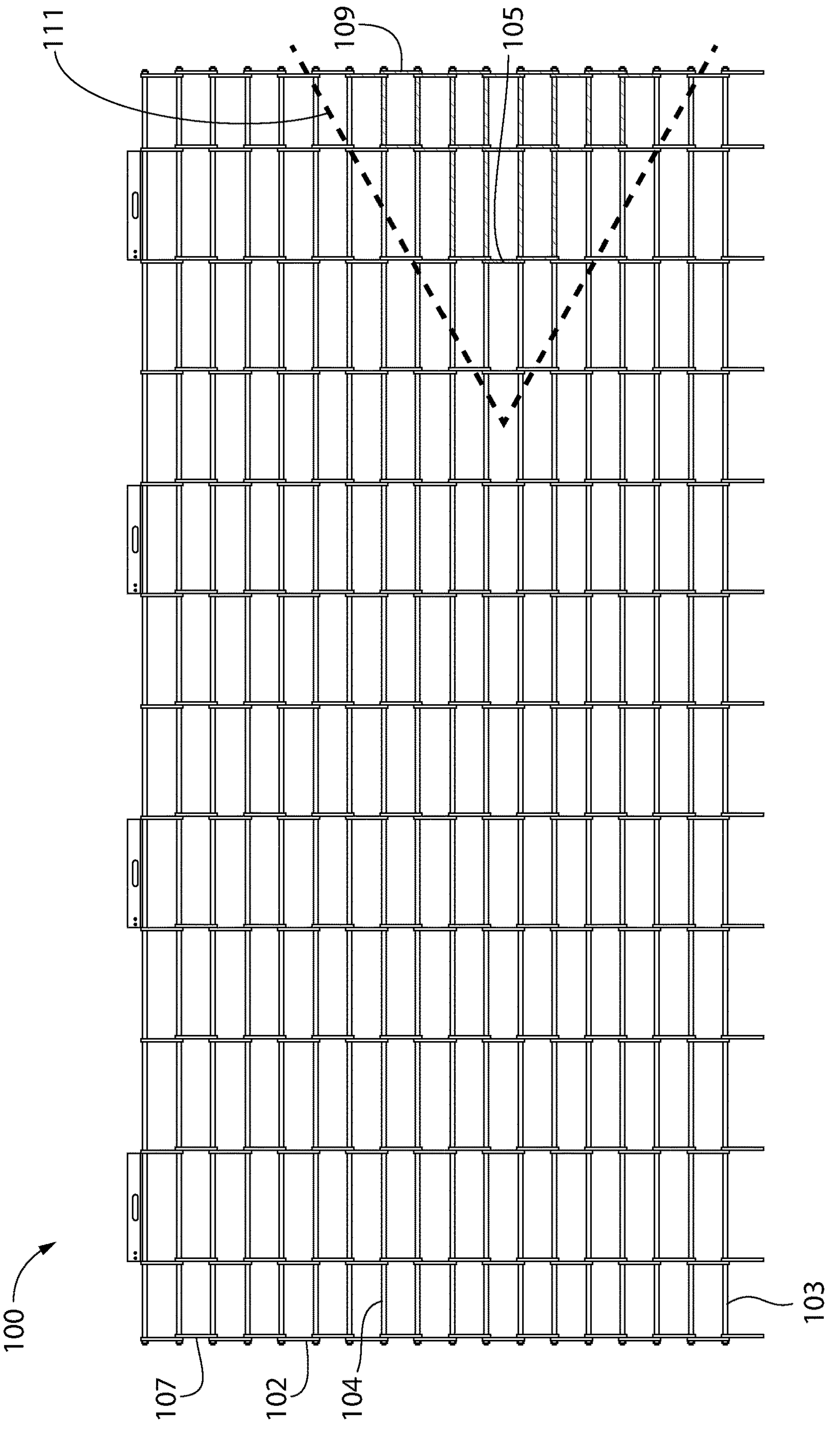
FIG. 1 illustrates an exemplary rolling grill enclosure in accordance with an exemplary embodiment of the present invention.

Exemplary embodiments of the present invention provide a replacement for a rolling grill enclosure and method thereof. Embodiments are shown in FIGS. 1-8. In use, enclosure 100 may be used to provide safety and protection to an enclosed area, selectively allowing ingress and egress. As shown in FIG. 1, enclosure 100 may be comprised of links 102, rods 104, and/or spacers 103. Enclosure 100 may have sides 107 and 109 which make up the lateral boundaries of enclosure 100. In some embodiments, removing links 102 from sides 107 and 109 are the only way to replace links 102 should they become damaged. Links 102 may be coupled to rods 104 to create a grid-like enclosure. In some embodiments, the grid-like enclosure is a rolling grill enclosure. Rods 104 may be configured to rotate with respect to links 102. In circumstances it may be desirable to replace damaged links. For example, link 105 may be a damaged link, which may affect the structural integrity of the enclosure. In some embodiments, damaged link 105 is replaceable without the need to disturb or replace some or all of the links 102 between damaged link 105 and side 107 or 109. For example, referring to FIG. 1, damaged link 105 may be disposed closest to access side 109. Therefore, in some embodiments, to remove damaged link 105, links 102 between damaged link 105 and access side 109 may not need to be replaced as indicated by area 111.

Replacement link 200 and 700, as shown in FIGS. 2-8, may be used to replace links 102 when links 102 become damaged or broken. In some embodiments, replacement links 200 and 700 may be used to replace damaged link 105 without removing multiple links 102. Enclosure 100 may include edge links disposed at sides 107 and 109, and field links disposed between sides 107 and 109. In some embodiments, replacing field links may be as easy as replacing edge links, even though access to field links appears to require removing any intermediate link between sides 107 or 109 and the field link. In some embodiments, replacement link 200 and 700 may be used to replace field links while edge links may remain in their fixed position. Links 102 may be made of powder metal stainless steel 304. In one embodiment, replacement links 200 and 700 may be made of lasered stainless steel 304. However, replacement links 200 and 700 may be made out of any material desired. For example, replacement links 200 and 700 may be made out of polymer, metal, steel, or any other material desired.

Referring to FIGS. 2-5, replacement link 200 may include body 202, first end 204, second end 206, and grommet axis 208. In one embodiment, body 202, first end 204, and second end 206 are comprised of stainless steel. However, body 202, first end 204, and second end 206 may be comprised of other materials such as hard plastic, carbon steel, aluminum, or other alloys. Body 202 may include longitudinal axis 210. Body 202 may be a longitudinal body disposed about longitudinal axis 210. Longitudinal axis 210 may be defined by an arcuate portion of a circle. In one embodiment, body 202 may be substantially rigid. In another embodiment, body 202 may be flexible. In one embodiment, body 202 is a curved longitudinal body. In another embodiment, body 202 is a substantially non-curved longitudinal body. Body 202 may have a uniform thickness throughout a substantial portion of body 202. However, in some embodiments, body 202 may have a variable thickness throughout a substantial portion of body 202. Body 202 may be disposed between first end 204 and second end 206. First end 204 may include first end grommet 300 and second end 206 may include second end grommet 400. First end grommet 300 may include first center 304 and second end grommet 400 may include second center 404. Grommet axis 208 may bisect first center 304 of first end grommet 300 and second center 404 of second end grommet 400. First center 304 may be offset from longitudinal axis 210 in a first direction, and second center 404 may be offset from longitudinal axis 210 in a second direction. First direction may be opposite facing from second direction. In one embodiment, first center 304 and second center 404 may be on opposite sides of longitudinal axis 210. In one embodiment, not shown, first direction and second direction may be the same direction.

Figure 2:
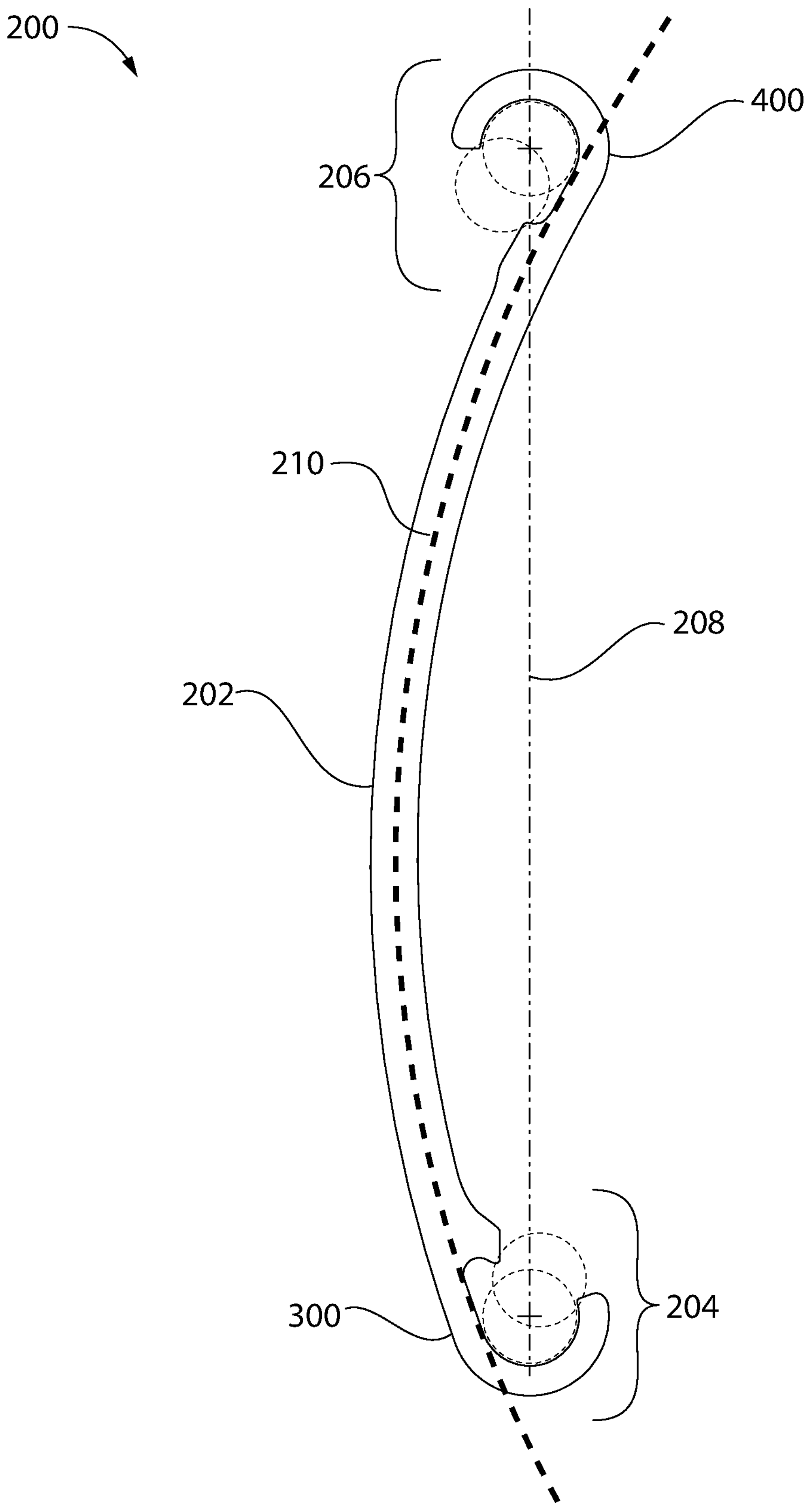
FIG. 2 illustrates an exemplary replacement link in accordance with an exemplary embodiment of the present invention.
Figure 3:
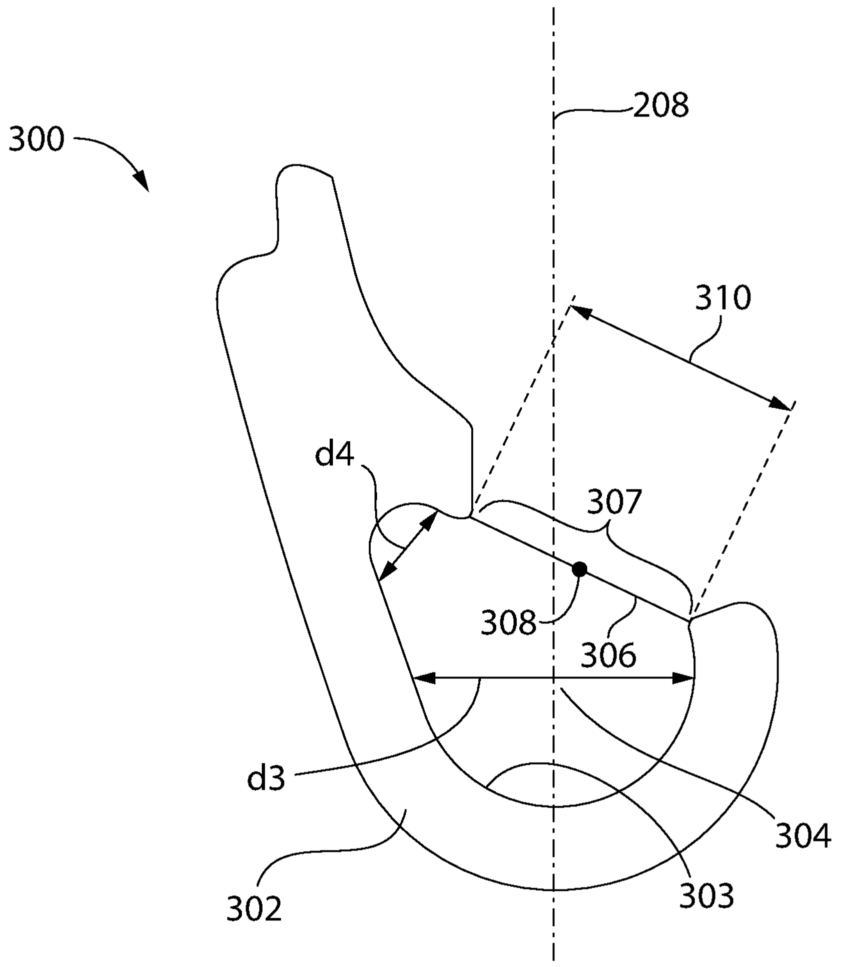
FIG. 3 illustrates an exemplary replacement link in accordance with an exemplary embodiment of the present invention.
Figure 5:
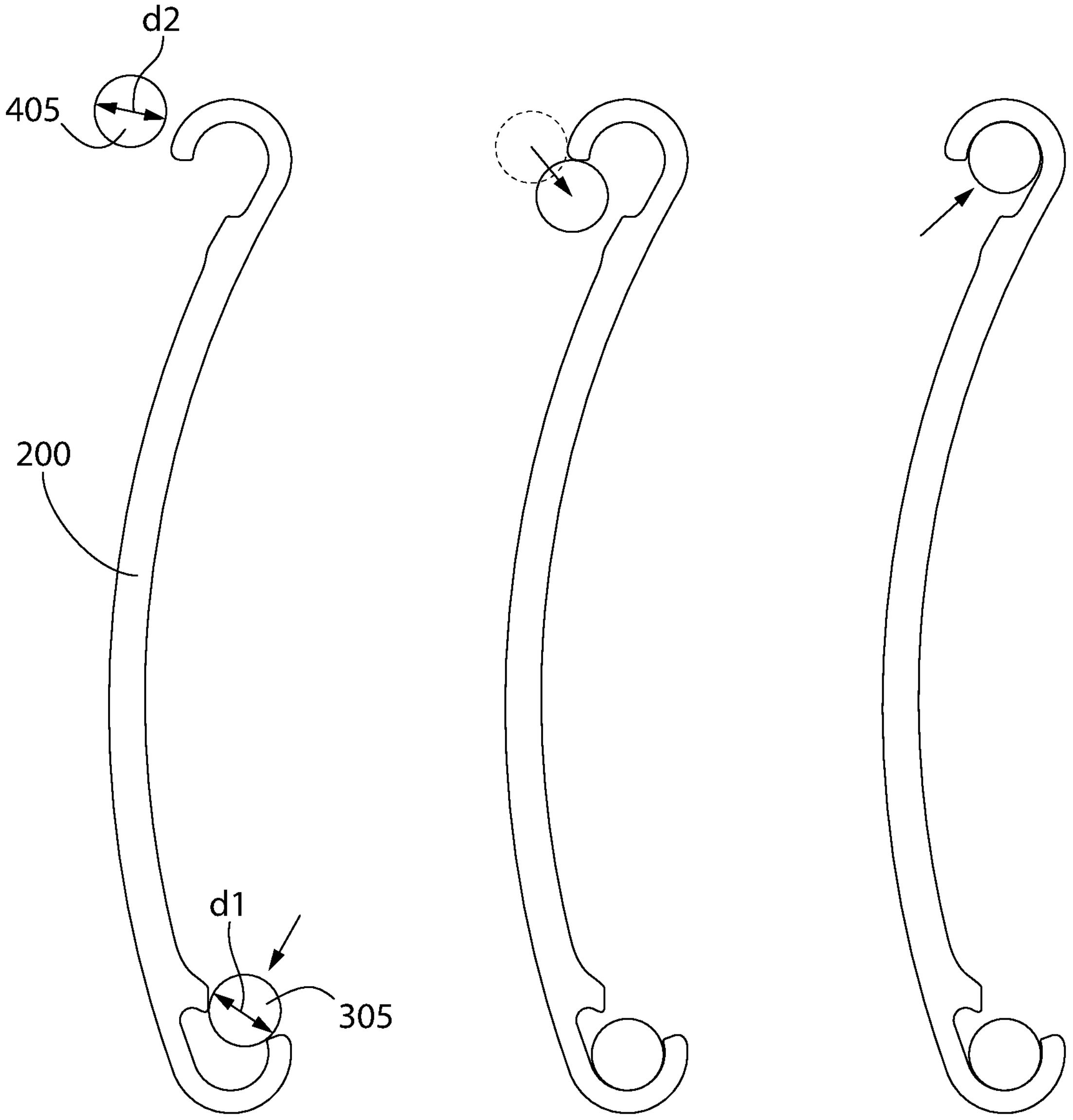
FIG. 5 illustrates an exemplary method for using a replacement link in accordance with an exemplary embodiment of the present invention.

Referring to FIGS. 2-3, and 5, first end grommet 300 may include first grommet body 302, first center 304, and first aperture 306. First grommet body 302 may be contiguous with first end 204 of body 202. First grommet body 302 may include a curved portion disposed about first center 304 and may be discontinuous. The curved portion of first grommet body 302 may have a uniform thickness. The uniform thickness of body 202 may be greater than the uniform thickness of the curved portion of first grommet body 302. First aperture 306 may include first aperture width 310 and may include first midpoint 308. First aperture width 310 may be from 0 inches to approximately 3.0 inches, from approximately 0.1 inches to approximately 2.5 inches, or from approximately 0.2 inches to approximately 2.0 inches. In some embodiments, first aperture width 310 is from approximately 0.285 inches to 0.295 inches. First midpoint 308 may be disposed within first aperture 306 and may be the midpoint between the two closest points of first aperture 306. First midpoint 308 may be offset from grommet axis 208 in a first direction. First aperture 306 may be entirely offset from grommet axis 208 in the first direction.

In one embodiment, an acute angle is formed between a line normal to first midpoint 308, extending away from first center 304, and grommet axis 208. The acute angle may be an angle of 0° to approximately 50°, approximately 10° to approximately 40°, or approximately 20° to approximately 30°. In a preferred embodiment, such as the embodiment illustrated in FIG. 2, an acute angle of approximately 10° to approximately 40° (e.g., approximately) 25° may be formed between a line normal to first midpoint 308, extending away from first center 304, and grommet axis 208. Referring to FIG. 3, first aperture 306 may include aperture line 307. Aperture line 307 may be a line formed by the shortest distance between two points on opposite ends of first aperture 306. A line normal to aperture line 307 and extending through first midpoint 308 may be offset from first center 304. For example, the line normal to aperture line 307, extending through first midpoint 308 may not bisect first center 304.

First grommet body 302 may be configured and dimensioned to receive first rod 305. First rod 305 may have first rod diameter d1 that is larger than first aperture 306. For example, first rod 305 may have first rod diameter d1, which is larger than first aperture width 310 of first aperture 306. First rod diameter d1 may be approximately 0.1 inches to approximately 2.0 inches, approximately 0.3 inches to approximately 1.5 inches, or approximately 0.8 inches to approximately 1.2 inches. In some embodiments, first rod diameter d1 is approximately 0.25 inches to approximately 0.3 1 inches. Replacement link 200 may be pivotable about first rod 305 when first rod 305 is received in the first grommet body 302. For example, first rod 305 may be received within first aperture 306 of first end grommet 300, and replacement link 200 may then be pivotable about the first rod.

First grommet body 302 may be configured to deflect about first rod 305 when first rod 305 is urged through first aperture 306. For example, first grommet body 302 may deflect during installation of first grommet body 302 on first rod 305. First grommet body 302 may be configured to have spring tension due to its shape and material. The spring tension of first grommet body 302 may allow first grommet body 302 to return to its original shape after deflecting about first rod 305. In addition, first grommet body 302 may include knife edge features, which may prevent first rod 305 from exiting first aperture 306 of first grommet body 302 when first rod 305 is urged through first aperture 306. In one embodiment, first rod 305 is configured to deflect when inserted into first end grommet 300. In some embodiments, first rod 305 may be configured to flex or deflect in addition to first grommet body 302. First rod 305 may be configured to deflect along its horizontal length with the cross-section of first rod 305 remaining unchanged. In some embodiments, first rod 305 includes support points, which are located at sides 107 and 109 of enclosure 100. In one embodiment, first rod 305 deflects along its horizontal length about its support points. For example, first rod 305 may flex along its horizontal length about its support points when first rod 305 is urged into first aperture 306.

First grommet body 302 may include interior face 303. Interior face 303 of first grommet body 302 may be a substantially teardrop shape having first diameter d3 and second diameter d4. First diameter d3 of interior face 303 may be substantially equal to diameter d1 of first rod 305. First diameter d3 of interior face 303 may be greater than second diameter d4 of interior face 303.

Figure 4:
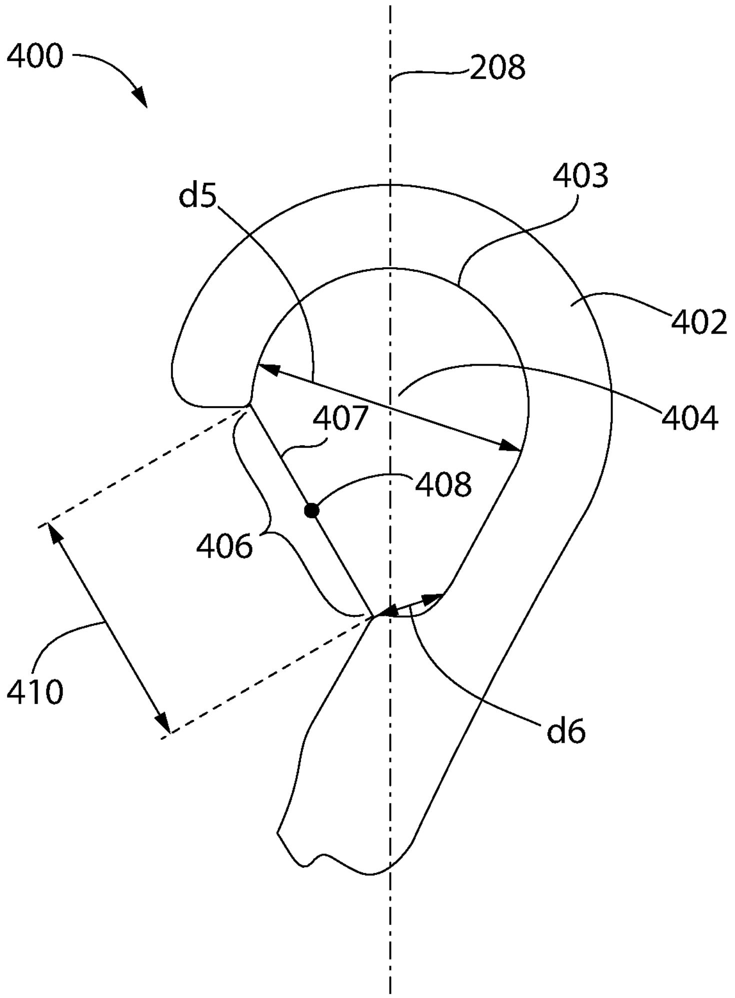
FIG. 4 illustrates an exemplary replacement link in accordance with an exemplary embodiment of the present invention.

Referring to FIGS. 2 and 4-5, second end grommet 400 may include second grommet body 402, second center 404, and second aperture 406. Second grommet body 402 may be contiguous with second end 206 of body 202. Second grommet body 402 may include a curved portion disposed about second center 404 and may be discontinuous. The curved portion of second grommet body 402 may have a uniform thickness. The uniform thickness of body 202 may be greater than the uniform thickness of the curved portion of second grommet body 402. Second aperture 406 may include second aperture width 410 and may include second midpoint 408. Second aperture width 410 may be 0 inches to approximately 3.0 inches, approximately 0.1 inches to approximately 2.5 inches, or approximately 0.2 inches to approximately 2.0 inches. In some embodiments, second aperture width 410 is approximately 0.285 inches to 0.295 inches. Second midpoint 408 may be disposed within second aperture 406 and may be the midpoint between the two closest points of second aperture 406. Second midpoint 408 may be offset from grommet axis 208 in a second direction, where the second direction is opposite facing than the first direction.

In one embodiment, second aperture width 410 may be substantially equal to first aperture width 310. Grommet axis 208 may pass through second aperture 406. In one embodiment, an obtuse angle is formed between a line normal to second midpoint 408, extending away from second center 404, and grommet axis 208. The obtuse angle may be an angle of approximately 95° to approximately 150°, approximately 105° to approximately 140°, or approximately 115° to approximately 130°. In a preferred embodiment, an obtuse angle of approximately 105° to approximately 140° (e.g., approximately) 120° may be formed between a line normal to second midpoint 408, extending away from second center 404, and grommet axis 208. Second aperture 406 may include aperture line 407. Aperture line 407 may be a line formed by the shortest distance between two points on opposite ends of second aperture 406. A line normal to aperture line 407 and extending through second midpoint 408 may be offset from second center 404. For example, the line normal to aperture line 407, extending through second midpoint 408 may not bisect second center 404.

Second grommet body 402 may be configured and dimensioned to receive a second rod. Second rod 405 may have second rod diameter d2 that is larger than second aperture 406. For example, second rod diameter d2 may be larger than second aperture width 410 of second aperture 406. Second rod diameter d2 may be from approximately 0.1 inches to approximately 2.0 inches, from approximately 0.3 inches to approximately 1.5 inches, or from approximately 0.8 inches to approximately 1.2 inches. In some embodiments, second rod diameter d2 is from approximately 0.25 inches to approximately 0.3 1 inches. Second rod 405 may be received within second aperture 406 of second end grommet 400, and after replacement link 200 has been pivoted about the first rod 305.

Second grommet body 402 may be configured to deflect about second rod 405 when second rod 405 is urged through second aperture 406. For example, second grommet body 402 may deflect during installation of second grommet body 402 on second rod 405. Second grommet body 402 may be configured to have spring tension due to its shape and material. The spring tension of second grommet body 402 may allow second grommet body 402 to return to its original shape after deflecting about second rod 405. In addition, second grommet body 402 may include knife edge features, which may prevent second rod 405 from exiting second aperture 406 of second grommet body 402 when second rod 405 is urged through second aperture 406. In one embodiment, second rod 405 is configured to deflect when inserted into second end grommet 400. In some embodiments, second rod 405 may be configured to flex or deflect in addition to second grommet body 402. Second rod 405 may be configured to deflect along its horizontal length with the cross-section of second rod 405 remaining unchanged. In some embodiments, second rod 405 includes support points, which are located at sides 107 and 109 of enclosure 100. In one embodiment, second rod 405 deflects along its horizontal length about its support points. For example, second rod 405 may flex along its horizontal length about its support points when second rod 405 is urged into second aperture 406.

Second grommet body 402 may include interior face 403. Interior face 403 of second grommet body 402 may include first diameter d5 and second diameter d6. First diameter d5 of interior face 403 may be substantially equal to diameter d2 of second rod 405. First diameter d5 of interior face 403 may be greater than second diameter d6 of interior face 403. First diameter d5 of second grommet body 402 may be substantially equal to first diameter d3 of first grommet body 302, and second diameter d6 of second grommet body 402 may be substantially equal to second diameter d4 of first grommet body 302. However, diameters, d3, d4, d5, d6 may vary in size. For example, diameter d3 may vary based on diameter d1 of first rod 305 and diameter d5 may vary based on diameter d2 of second rod 405.

Referring to FIG. 5, replacement link 200 may be used as a replacement for damaged link 105. In practice, damaged link 105 may be removed by cutting through damaged link 105 along the body of damaged link 105 proximate first rod 305 and second rod 405. Replacement link 200 may then be coupled to first rod 305, rotated, and then coupled to second rod 405. For example, first aperture 306 of first end grommet 300 may be coupled to first rod 305. In one embodiment, first rod 305 may be located below second rod 405. First rod 305 may be inserted into first aperture 306 of first end grommet 300. During insertion of first rod 305 into first aperture 306, first grommet body 302 may be deflected about first rod 305 due to the spring tension of first grommet body 302. In one embodiment, first rod 305 may be configured to deflect along its horizontal length about its support points when inserted into first end grommet 300.

In one embodiment, a width of first aperture 306 may be reduced after inserting first rod 305 through first aperture 306, and within first end grommet 300. For example, first aperture width 310 may be reduced using a tool or manually to reduce the width of first aperture 306 after insertion of first rod 305 through first aperture 306, and further, to secure first grommet body 302 around first rod 305. Once first rod 305 has been inserted through first aperture 306, and is disposed within first end grommet 300, replacement link 200 may be rotated about first rod 305 such that second end grommet 400 of replacement link 200 engages with second rod 405. Once replacement link 200 has been rotated such that second end grommet 400 engages second rod 405, second rod 405 may be inserted into second aperture 406. After rotation of replacement link 200, second rod 405 may flex to allow for insertion of second rod 405 into second aperture 406. For example, prior to insertion of second rod 405 into second aperture 406 of second end grommet 400, pressure may be applied to second rod 405 to cause it to flex along its horizontal length about its support points to allow second aperture 406 to engage second rod 405. In the alternative, body 202 may be deflected prior to insertion of second rod 405 into second aperture 406 to allow second aperture 406 to engage second rod 405. During insertion of second rod 405 into second aperture 406, second grommet body 402 may be deflected about second rod 405.

In one embodiment, a width of second aperture 406 may be reduced after inserting second rod 405 through second aperture 406, and within second end grommet 400. For example, second aperture width 410 may be reduced using a tool or manually to reduce the width of second aperture 406 after insertion of second rod 405 through second aperture 406, and further, to secure second grommet body 402 around second rod 405.

Figure 6:
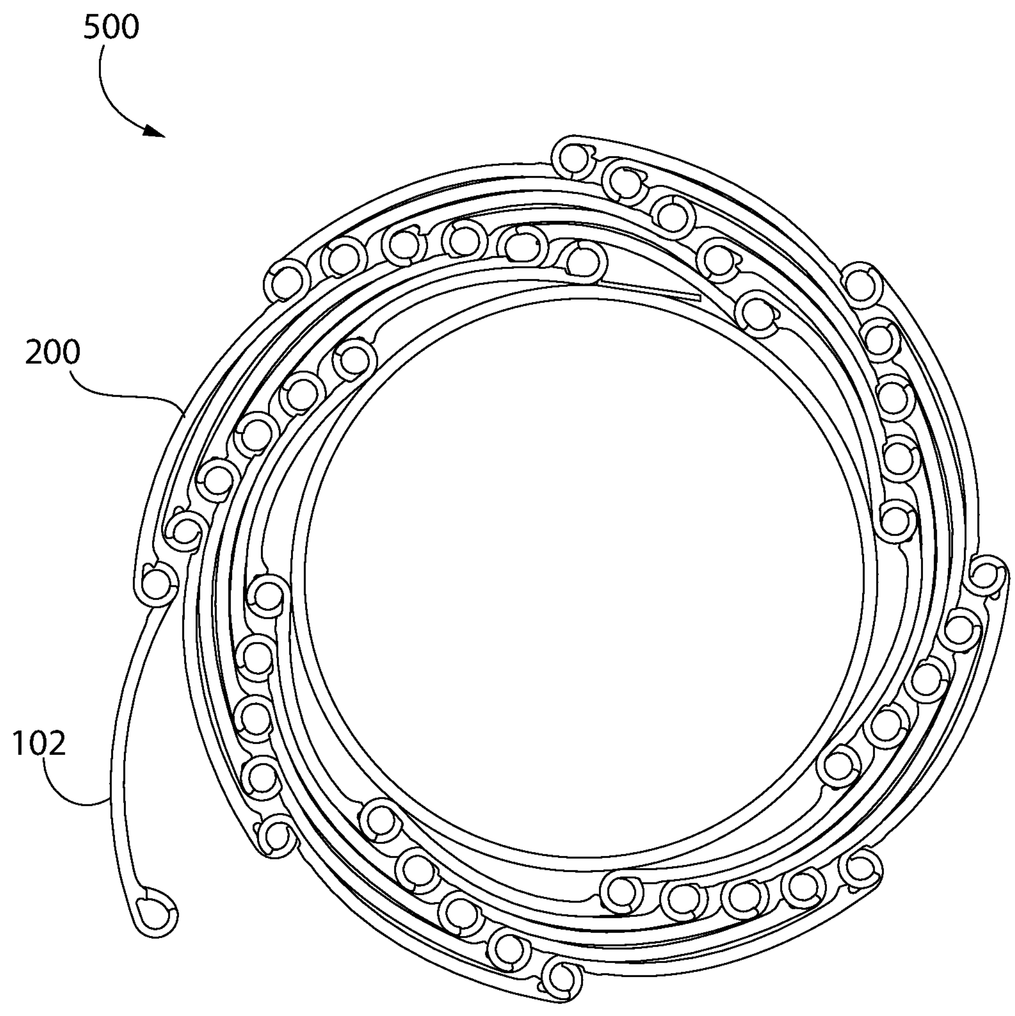
FIG. 6 illustrates an exemplary rolling grill enclosure in accordance with an exemplary embodiment of the present invention.
Figure 7:
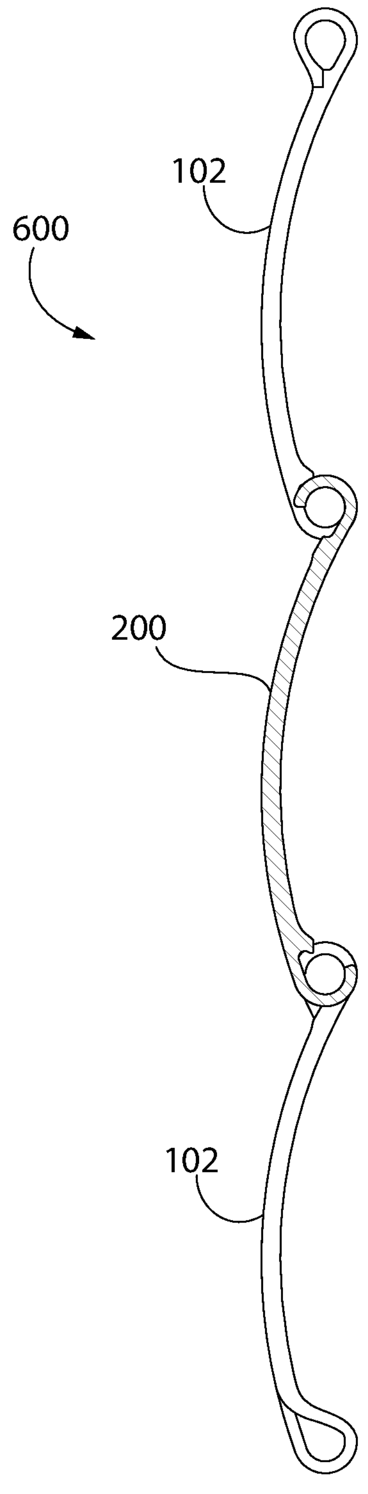
FIG. 7 illustrates an exemplary replacement link in accordance with an exemplary embodiment of the present invention.

Referring to FIGS. 6-7, a portion of body 202 of replacement link 200 may be substantially curved to allow a plurality of replacement links 200 and links 102 to be nested together. For example, as shown in FIG. 6, when enclosure 100 is a nested position, links 102 and replacement links 200 may be shaped to be configured to nest on top of one another (e.g., when the closure is coiled about a shaft). Further, links 102 and replacement links 200 may have varying lengths and degrees of curvature to allow links 102 and replacement links 200 in different positions of enclosure 100 to be nested on top of each other when enclosure 100 is in the nested position. As shown in FIG. 7, replacement link 200 may replace damaged link 105 and may be disposed between or among links 102. Replacement link 200 may be sized and shaped to resemble link 102 to allow for easy replacement.

Figure 8:
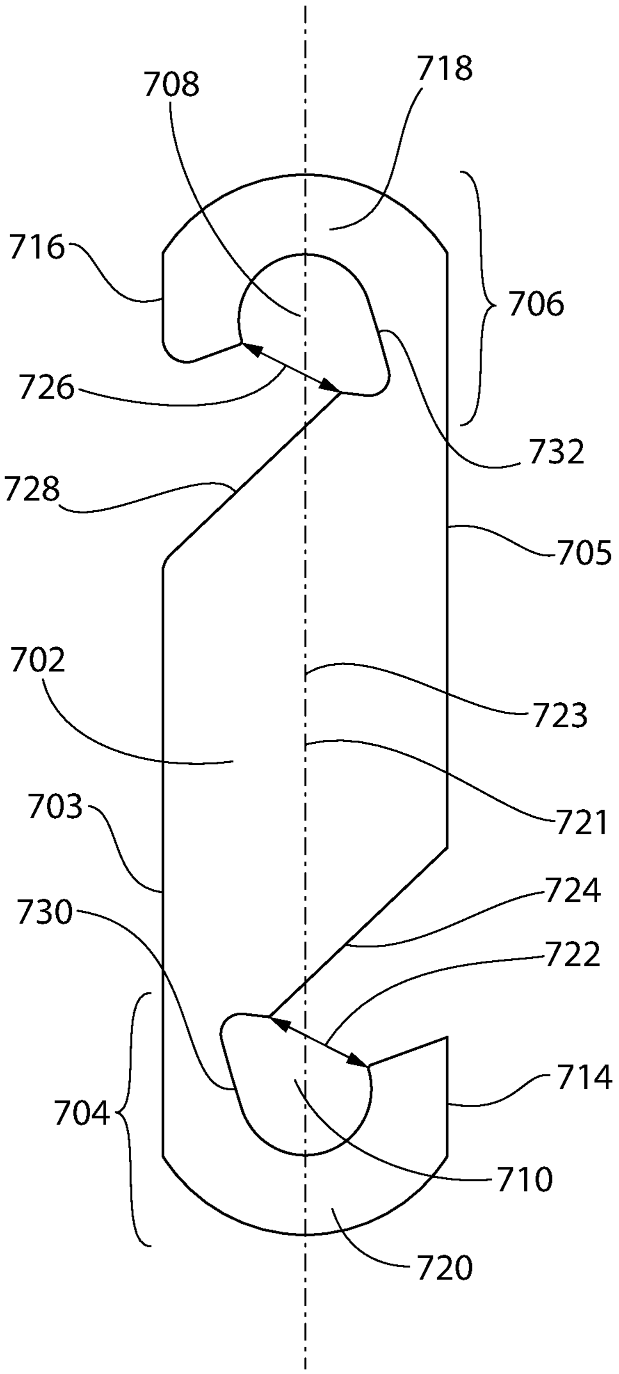
FIG. 8 illustrates an exemplary replacement link in accordance with an exemplary embodiment of the present invention.

An alternative replacement link for a rolling grill enclosure is shown in FIG. 8. FIG. 8 shows replacement link 700 having body 702, first end 704, second end 706, and grommet axis 721. Body 702 may include longitudinal axis 723, which may bisect body 702 longitudinally. Body 702 may be comprised of a longitudinal body and may have first edge 705 and second edge 703. First edge 705 and second edge 703 may be offset on opposite sides of longitudinal axis 723. First edge 705 may be substantially parallel to second edge 703. In one embodiment, body 702 is disposed between first end 704 and second end 706. First end 704 may include first end grommet 714 having first center 710, and second end 706 may include second end grommet 716 having second center 708. First end grommet 714 may be contiguous with body 702, and may include first grommet body 720 and first aperture 722. First grommet body 720 may be discontinuous. Second end grommet 716 may be contiguous with body 702, and may include second grommet body 718 and second aperture 726. Grommet axis 721 may intersect first center 710 and second center 708, and may be substantially parallel to longitudinal axis 723.

Body 702 may further include first guide face 724 and second guide face 728. First guide face 724 may be disposed at an obtuse angle to longitudinal axis 723. First guide face 724 may extend from first edge 705 across longitudinal axis 723 and may terminate proximate to interior surface 730 of first end grommet 714. Second guide face 728 may be disposed at an obtuse angle to longitudinal axis 723. Second guide face 728 may extend from second edge 703 across longitudinal axis 723 and may terminate proximate to interior surface 732 of second end grommet 716. Interior surface 730 and interior surface 732 may both include a first diameter and a second diameter. The first diameter of interior surface 730 may be substantially equal to the first diameter of interior surface 732, and the second diameter of interior surface 730 may be substantially equal to the second diameter of interior surface 732.

First aperture 722 of first end grommet 714 may be shaped and dimensioned to receive a first rod. First aperture 722 may have a width that is smaller than the diameter of first rod, and first grommet body 720 may deflect to receive the first rod. The width of first aperture 722 may be approximately 0 inches to approximately 3.0 inches, approximately 0.1 inches to approximately 2.5 inches, or approximately 0.2 inches to approximately 2.0 inches. In some embodiments, the width of first aperture 722 is approximately 0.285 inches to approximately 0.295 inches. First grommet body 720 may deflect during installation of first grommet body 720 on the first rod. First grommet body 720 may be configured to have spring tension due to its shape and material. The spring tension of first grommet body 720 may allow first grommet body 720 to return to its original shape after deflecting about the first rod. In addition, first grommet body 720 may include knife edge features, which may prevent the first rod from exiting first aperture 722 of first grommet body 720 when the first rod is urged through first aperture 722. In some embodiments, the first rod may be configured to flex or deflect in addition to first grommet body 720. The first rod may be configured to deflect along its horizontal length with the cross-section of the first rod remaining unchanged. In some embodiments, the first rod includes support points, which are located at sides 107 and 109 of enclosure 100. In one embodiment, the first rod deflects along its horizontal length about its support points. For example, the first rod may flex along its horizontal length about its support points when the first rod is urged into first aperture 722.

Once first aperture 722 receives the first rod, body 702 may be pivoted about the first rod such that second aperture 726 of second end grommet 716 engages a second rod. The second rod may have a diameter greater than a width of second aperture 726. The width of second aperture 726 may be approximately 0 inches to approximately 3.0 inches, approximately 0.1 inches to approximately 2.5 inches, or approximately 0.2 inches to approximately 2.0 inches. In some embodiments, the width of second aperture 726 is approximately 0.285 inches to approximately 0.295 inches. The second rod may be urged through second aperture 726, thereby resulting in second grommet body 718 deflecting to receive the second rod. In one embodiment, the second rod is configured to flex or deflect when inserted into second end grommet 716. In some embodiments, second rod may deflect in addition to second grommet body 718. Second grommet body 718 may deflect during installation of second grommet body 718 on the second rod. Second grommet body 718 may be configured to have spring tension due to its shape and material. The spring tension of second grommet body 718 may allow second grommet body 718 to return to its original shape after deflecting about the second rod. In addition, second grommet body 718 may include knife edge features, which may prevent the second rod from exiting second aperture 726 of second grommet body 718 when the second rod is urged through second aperture 726.

In some embodiments, the second rod may be configured to flex or deflect in addition to second grommet body 718. The second rod may be configured to deflect along its horizontal length with the cross-section of the second rod remaining unchanged. In some embodiments, the second rod includes support points, which are located at sides 107 and 109 of enclosure 100. In one embodiment, the second rod deflects along its horizontal length about its support points. For example, the second rod may flex along its horizontal length about its support points when the second rod is urged into second aperture 726.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. Unless specifically set forth herein, the terms “a”, “an” and “the” are not limited to one element but instead should be read as meaning “at least one”.

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

What is claimed is:

1. A replacement link for a rolling grill enclosure comprising:

a longitudinal body disposed about a longitudinal axis, wherein the longitudinal body comprises a curved longitudinal body;

a first end grommet contiguous with a first end of the longitudinal body, the first end grommet having a discontinuous first grommet body disposed about a first center, wherein the first center is offset from the longitudinal axis in a first direction; and a second end grommet contiguous with a second end of the longitudinal body, the second end grommet having a discontinuous second grommet body disposed about a second center, wherein the second center is offset from the longitudinal axis in a second direction, the first center and the second center being on opposite sides of the longitudinal axis, wherein the discontinuous first grommet body and the discontinuous second grommet body each comprises an interior face that is substantially a tear drop shape comprising a first diameter and a second diameter, wherein the first diameter is greater than the second diameter, and a knife edge feature is formed in the discontinuous first grommet body and the discontinuous second grommet body adjacent to a portion of the interior face that has the second diameter, wherein the knife edge feature comprises a flat surface formed between the portion of the interior face that has the second diameter and a curved surface of the curved longitudinal body.

2. The replacement link of claim 1, further comprising:

a grommet axis bisecting the first center and the second center, the discontinuous first grommet body having a first aperture with a first aperture width, the first aperture width including a first midpoint that is offset from the grommet axis in the first direction; and the discontinuous second grommet body having a second aperture with a second aperture width, the second aperture width including a second midpoint that is offset from the grommet axis in the second direction.

3. The replacement link of claim 2, wherein the first aperture is entirely offset from the grommet axis in the first direction.

4. The replacement link of claim 2, wherein the grommet axis passes through the second aperture.

5. The replacement link of claim 2, wherein the discontinuous first grommet body is configured and dimensioned to receive a first rod having a first rod diameter that is larger than the first aperture width, the replacement link being pivotable about the first rod when the first rod is received in the discontinuous first grommet body.

6. The replacement link of claim 5, wherein the discontinuous first grommet body is configured to deflect about the first rod when the first rod is urged through the first aperture.

7. The replacement link of claim 5, wherein the first diameter of the discontinuous first grommet body is substantially equal to the first rod diameter.

8. The replacement link of claim 2, wherein the discontinuous second grommet body is configured and dimensioned to receive a second rod having a second rod diameter that is larger than the second aperture width, the replacement link being pivotable about the second rod when the second rod is received in the discontinuous second grommet body.

9. The replacement link of claim 8, wherein the discontinuous second grommet body is configured to deflect about the second rod when the second rod is urged through the second aperture.

10. The replacement link of claim 8, wherein the first diameter of the discontinuous second grommet body is substantially equal to the second rod diameter.

11. The replacement link of claim 10, wherein the first diameter of the discontinuous second grommet body is substantially equal to the first diameter of the discontinuous first grommet body and the second diameter of the discontinuous second grommet body is substantially equal to the second diameter of the discontinuous first grommet body.

12. The replacement link of claim 2, wherein an obtuse angle between a) a first line normal to a second line that runs through the second midpoint between two closest points of the second aperture and extending away from the second center and b) the grommet axis is between 105° degrees and 140°.

13. The replacement link of claim 2, wherein an acute angle between a) a first line normal to a second line that runs through the first midpoint between two closest points of the first aperture and extending away from the first center and b) the grommet axis is between 10° degrees and 40°.

14. The replacement link of claim 2, wherein a line normal to the first aperture width extending through the first midpoint is offset from the first center.

15. The replacement link of claim 2, wherein a line normal to the second aperture width extending through the second midpoint is offset from the second center.

16. The replacement link of claim 2, wherein the first aperture width and the second aperture width are equal.

17. The replacement link of claim 1, wherein a curved portion of the discontinuous first grommet body has a uniform thickness.

18. The replacement link of claim 1, wherein a curved portion of the discontinuous second grommet body has a uniform thickness.

19. The replacement link of claim 1, wherein the longitudinal body has a uniform thickness throughout a substantial portion of the longitudinal body.

20. The replacement link of claim 19, wherein the uniform thickness of the longitudinal body is greater than a uniform thickness of a curved portion of the discontinuous first grommet body and a uniform thickness of a curved portion of the discontinuous second grommet body.

21. The replacement link of claim 1, wherein the longitudinal body includes a first edge and a second edge, the first edge being substantially parallel to the second edge, the first edge and the second edge being offset on opposite sides of the longitudinal axis.

22. A grill for an enclosure system comprising:

a first side and a second side opposite the first side;

a plurality of edge links adjacent the first side and adjacent the second side;

a plurality of field links disposed between the plurality of edge links; and a replacement link configured to replace one of the plurality of field links while the plurality of edge links remain in a fixed position, the replacement link comprising:

a longitudinal body disposed about a longitudinal axis, wherein the longitudinal body comprises a curved longitudinal body;

a first end grommet contiguous with a first end of the longitudinal body, the first end grommet having a discontinuous first grommet body disposed about a first center, wherein the first center is offset from the longitudinal axis in a first direction; and a second end grommet contiguous with a second end of the longitudinal body, the second end grommet having a discontinuous second grommet body disposed about a second center, wherein the second center is offset from the longitudinal axis in a second direction, the first center and the second center being on opposite sides of the longitudinal axis, wherein the discontinuous first grommet body and the discontinuous second grommet body each comprise an interior face that is substantially a tear drop shape comprising a first diameter and a second diameter, wherein the first diameter is greater than the second diameter, and a knife edge feature is formed in the discontinuous first grommet body and the discontinuous second grommet body adjacent to a portion of the interior face that has the second diameter, wherein the knife edge feature comprises a flat surface formed between the portion of the interior face that has the second diameter and a curved surface of the curved longitudinal body.

* * * * *